United States Patent
Chen et al.

(10) Patent No.: US 12,190,588 B2
(45) Date of Patent: Jan. 7, 2025

(54) OCCLUSION-AWARE MULTI-OBJECT TRACKING

(71) Applicant: Microsoft Technology Licensing, LLC, Redmond, WA (US)

(72) Inventors: Dongdong Chen, Bellevue, WA (US); Qiankun Liu, Hefei (CN); Lu Yuan, Redmond, WA (US); Lei Zhang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 242 days.

(21) Appl. No.: 17/339,413

(22) Filed: Jun. 4, 2021

(65) Prior Publication Data

US 2022/0391621 A1    Dec. 8, 2022

(51) Int. Cl.
| | |
|---|---|
| G06V 20/52 | (2022.01) |
| G06F 18/214 | (2023.01) |
| G06N 3/045 | (2023.01) |
| G06T 7/20 | (2017.01) |
| G06V 10/25 | (2022.01) |
| G06V 10/44 | (2022.01) |

(52) U.S. Cl.
CPC .......... *G06V 20/52* (2022.01); *G06F 18/2155* (2023.01); *G06N 3/045* (2023.01); *G06T 7/20* (2013.01); *G06V 10/25* (2022.01); *G06V 10/44* (2022.01); *G06T 2207/30241* (2013.01)

(58) Field of Classification Search
None
See application file for complete search history.

(56) References Cited

U.S. PATENT DOCUMENTS

| | | | |
|---|---|---|---|
| 6,424,370 B1* | 7/2002 | Courtney | G06T 7/20 348/135 |
| 2005/0105764 A1* | 5/2005 | Han | G06V 10/24 340/5.1 |
| 2019/0333233 A1* | 10/2019 | Hu | G01S 13/04 |

(Continued)

OTHER PUBLICATIONS

Babaee, et al., "A Dual CNN-RNN for Multiple People Tracking", In Journal of Neurocomputing, vol. 368, Nov. 27, 2019, pp. 69-83.

(Continued)

*Primary Examiner* — Randolph I Chu
(74) *Attorney, Agent, or Firm* — Alleman Hall & Tuttle LLP

(57) ABSTRACT

A system for tracking a target object across a plurality of image frames. The system comprises a logic machine and a storage machine. The storage machine holds instructions executable by the logic machine to calculate a trajectory for the target object over one or more previous frames occurring before a target frame. Responsive to assessing no detection of the target object in the target frame, the instructions are executable to predict an estimated region for the target object based on the trajectory, predict an occlusion center based on a set of candidate occluding locations for a set of other objects within a threshold distance of the estimated region, each location of the set of candidate occluding locations overlapping with the estimated region, and automatically estimate a bounding box for the target object in the target frame based on the occlusion center.

11 Claims, 7 Drawing Sheets

(56) References Cited

U.S. PATENT DOCUMENTS

| | | | |
|---|---|---|---|
| 2020/0265591 A1* | 8/2020 | Yang | G06T 7/223 |
| 2022/0185625 A1* | 6/2022 | One | B66B 1/34 |
| 2022/0300748 A1* | 9/2022 | Tokmakov | G06V 20/56 |
| 2022/0301275 A1* | 9/2022 | Khadloya | G06V 10/62 |
| 2022/0377242 A1* | 11/2022 | Camacho | H04N 23/675 |
| 2023/0042004 A1* | 2/2023 | Kumar | G06F 18/24133 |

OTHER PUBLICATIONS

Bergmann, et al., "Tracking Without Bells and Whistles", In Proceedings of IEEE/CVF International Conference on Computer Vision, Oct. 27, 2019, 15 Pages.

Bernardin, et al., "Evaluating Multiple Object Tracking Performance: The CLEAR MOT Metrics", In Journal on Image and Video Processing, vol. 2008, Dec. 2008, pp. 1-10.

Bewley, et al., "Simple Online and Realtime Tracking", In Proceedings of the IEEE International Conference on Image Processing, Sep. 25, 2016, 5 Pages.

Braso, et al., "Learning a Neural Solver for Multiple Object Tracking", In Proceedings of the IEEE/CVF Conference on Computer Vision and Pattern Recognition, Jun. 14, 2020, pp. 6247-6257.

Chi, et al., "PedHunter: Occlusion Robust Pedestrian Detector in Crowded Scenes", In Proceedings of the AAAI Conference on Artificial Intelligence, vol. 34, No. 07, Apr. 3, 2020, pp. 10639-10646.

Chu, et al., "Detection in Crowded Scenes: One Proposal, Multiple Predictions", In Proceedings of the IEEE/CVF Conference on Computer Vision and Pattern Recognition, Jun. 13, 2020, pp. 12214-12223.

Chu, et al., "Online Multi-Object Tracking Using CNN-based Single Object Tracker with Spatial-Temporal Attention Mechanism", In Proceedings of IEEE International Conference on Computer Vision, Oct. 22, 2017, pp. 4836-4845.

Dendorfer, et al., "MOT20: A benchmark for multi object tracking in crowded scenes", In Repository of arXiv:2003.09003v1, Mar. 19, 2020, pp. 1-7.

Dollar, et al., "Pedestrian Detection: A Benchmark", In Proceedings of IEEE Conference on Computer Vision and Pattern Recognition, Jun. 20, 2009, pp. 304-311.

Ess, et al., "A Mobile Vision System for Robust Multi-Person Tracking", In Proceedings of IEEE Conference on Computer Vision and Pattern Recognition, Jun. 23, 2008, 8 Pages.

Felzenszwalb, et al., "Object Detection with Discriminatively Trained Part Based Models", In Journal of IEEE Transactions on Pattern Analysis and Machine Intelligence, vol. 32, No. 9, Sep. 22, 2009, pp. 1-20.

He, et al., "Mask R-CNN", In Proceedings of the IEEE International Conference on Computer Vision, Oct. 22, 2017, pp. 1-12.

Hornakova, et al., "Lifted Disjoint Paths with Application in Multiple Object Tracking", In Proceedings of International Conference on Machine Learning, Nov. 21, 2020, 12 Pages.

Karthik, et al., "Simple Unsupervised Multi-Object Tracking", In Repository of arXiv:2006.02609v1, Jun. 4, 2020, op. 1-14.

Kingma, et al., "Adam: A Method for Stochastic Optimization", In Repository of arXiv:1412.6980, Dec. 22, 2014, 9 Pages.

Law, et al., "CornerNet: Detecting Objects as Paired Keypoints", In Proceedings of the European Conference on Computer Vision, Sep. 8, 2018, pp. 1-17.

Li, et al., "Learning to Associate: Hybrid-Boosted Multi-Target Tracker for Crowded Scene", In Proceedings of IEEE Conference on Computer Vision and Pattern Recognition, Jun. 20, 2009, pp. 2953-2960.

Liu, et al., "GSM: Graph Similarity Model for Multi-Object Tracking", In Proceedings of the Twenty-Ninth International Joint Conference on Artificial Intelligence, Jul. 2020, pp. 530-536.

Liu, et al., "Real-Time Online Multi-Object Tracking in Compressed Domain", In Journal of IEEE Access, vol. 7, Jun. 2019, pp. 76489-76499.

Maaten, et al., "Visualizing Data using t-SNE", In Journal of Machine Learning Research, vol. 9, Nov. 2008, pp. 2579-2605.

Milan, et al., "MOT16: A Benchmark for Multi-Object Tracking", In Repository of arXiv:1603.00831v2, May 3, 2016, pp. 1-12.

Pang, et al., "TubeTK: Adopting Tubes to Track Multi-Object in a One-Step Training Model", In Proceedings of the IEEE/CVF Conference on Computer Vision and Pattern Recognition, Jun. 13, 2020, pp. 6308-6318.

Peng, et al., "Chained-Tracker: Chaining Paired Attentive Regression Results for End-to-End Joint Multiple-Object Detection and Tracking", In Proceedings of European Conference on Computer Vision, Aug. 23, 2020, pp. 1-21.

Porzi, et al., "Learning Multi-Object Tracking and Segmentation from Automatic Annotations", In Proceedings of the IEEE/CVF Conference on Computer Vision and Pattern Recognition, Jun. 13, 2020, pp. 6846-6855.

Redmon, et al., "You Only Look Once: Unified, Real-Time Object Detection", In Proceedings of IEEE Conference on Computer Vision and Pattern Recognition, Jun. 27, 2016, pp. 779-788.

Ren, et al., "Faster R-CNN: Towards Real-Time Object Detection with Region Proposal Networks", In Journal of IEEE Transactions on Pattern Analysis and Machine Intelligence, vol. 39, No. 6, Jun. 2017, pp. 1137-1149.

Sadeghian, et al., "Tracking The Untrackable: Learning to Track Multiple Cues with Long-Term Dependencies", In Proceedings of the IEEE International Conference on Computer Vision, Oct. 22, 2017, pp. 300-311.

Shao, et al., "CrowdHuman: A Benchmark for Detecting Human in a Crowd", In Repository of arXiv:1805.00123v1, Apr. 30, 2018, pp. 1-9.

Tang, et al., "Multiple People Tracking by Lifted Multicut and Person Re-identification", In Proceedings of IEEE Conference on Computer Vision and Pattern Recognition, Jul. 21, 2017, pp. 3539-3548.

Voigtlaender, et al., "MOTS: Multi-Object Tracking and Segmentation", In Proceedings of the IEEE/CVF Conference on Computer Vision and Pattern Recognition, Jun. 16, 2019, pp. 7942-7951.

Wang, et al., "CycAs: Self-supervised Cycle Association for Learning Re-Identifiable Descriptions", In Repository of arXiv:2007.07577v1, Jul. 15, 2020, pp. 1-16.

Wang, et al., "Towards Real-Time Multi-Object Tracking", In Repository of arXiv:1909.12605v2, Jul. 14, 2020, 17 Pages.

Wojke, et al., "Simple Online and Realtime Tracking with a Deep Association Metric", In Proceedings of IEEE International Conference on Image Processing, Sep. 17, 2017, 5 Pages.

Xiao, et al., "Joint Detection and Identification Feature Learning for Person Search", In Proceedings of IEEE Conference on Computer Vision and Pattern Recognition, Jul. 21, 2017, pp. 3415-3424.

Yang, et al., "Exploit All the Layers: Fast and Accurate CNN Object Detector with Scale Dependent Pooling and Cascaded Rejection Classifiers", In Proceedings of the IEEE Conference on Computer Vision and Pattern Recognition, Jun. 27, 2016, pp. 2129-2137.

Yu, et al., "POI: Multiple Object Tracking with High Performance Detection and Appearance Feature", In Proceedings of European Conference on Computer Vision, Oct. 8, 2016, pp. 1-7.

Zhang, et al., "CityPersons: A Diverse Dataset for Pedestrian Detection", In Proceedings of the IEEE Conference on Computer Vision and Pattern Recognition, Jul. 21, 2017, pp. 3213-3221.

Zhang, et al., "FairMOT: On the Fairness of Detection and Re-Identification in Multiple Object Tracking", In Repository of arXiv:2004.01888v5, Sep. 9, 2020, pp. 1-13.

Zhang, et al., "Multiplex Labeling Graph for Near-Online Tracking in Crowded Scenes", In Journal of IEEE Internet of Things Journal, vol. 7, No. 9, Sep. 2020, pp. 7892-7902.

Zheng, et al., "Person Re-Identification in the Wild", In Proceedings of IEEE Conference on Computer Vision and Pattern Recognition, Jul. 21, 2017, 10 Pages.

Zhou, et al., "Objects as Points", In Repository of arXiv:1904.07850v1, Apr. 16, 2019, pp. 1-12.

Zhou, et al., "Tracking Objects as Points", In Proceedings of European Conference on Computer Vision, Aug. 23, 2020, pp. 1-22.

Zhu, et al., "Crowded Human Detection via an Anchor-pair Network", In Proceedings of the IEEE/CVF Winter Conference on Applications of Computer Vision, Mar. 1, 2020, pp. 1391-1399.

(56) References Cited

OTHER PUBLICATIONS

Zhu, et al., "Online Multi-Object Tracking with Dual Matching Attention Networks", In Proceedings of the European Conference on Computer Vision, Sep. 8, 2018, pp. 1-17.

Lu, et al., "An Occlusion Tolerent Method for Multi-Object Tracking", In Proceedings of the 7th World Congress on Intelligent Control and Automation, Jun. 25, 2008, pp. 5105-5110.

"International Search Report and Written Opinion Issued in PCT Application No. PCT/US22/028647", Mailed Date: Sep. 21, 2022, 10 Pages.

Xu, et al., "Partial Observation vs. Blind Tracking through Occlusion", In Proceedings of 13th British Machine Vision Conference, Jan. 1, 2002, pp. 777-786.

\* cited by examiner

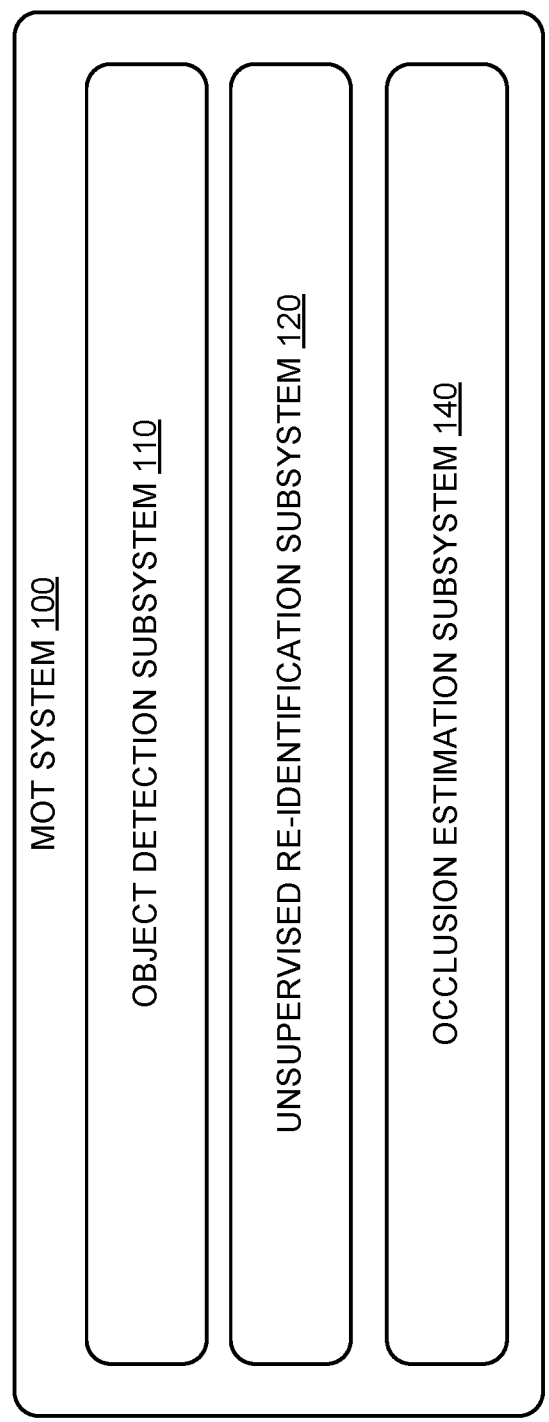

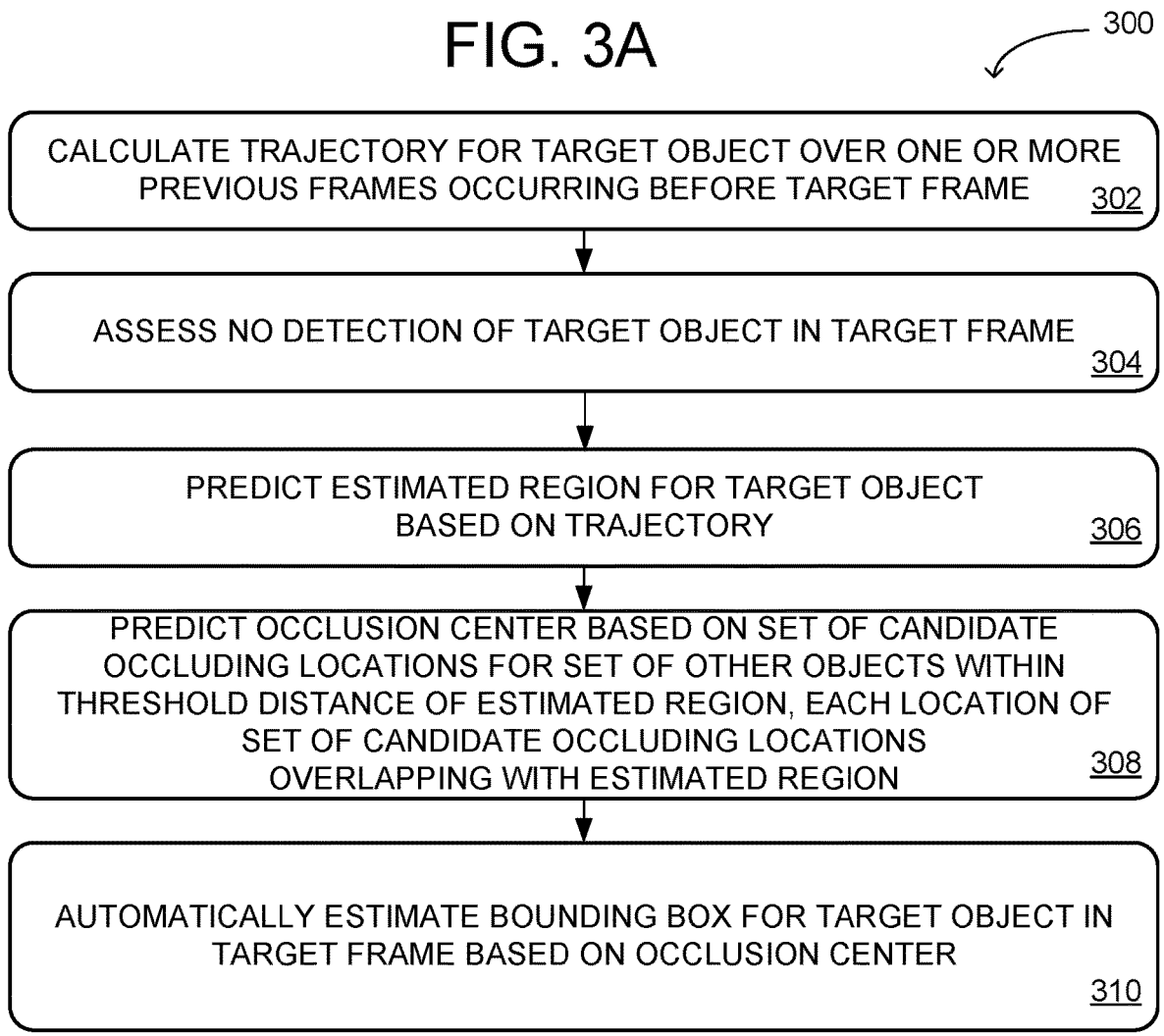

FIG. 4

Algorithm 1: State Machine of Online Tracking between Two Consecutive Frames

Input : $T^{t-1} = \{(b_i^{t-1}, id_i, w_i, p_i^{t-1})\}_{i=1}^{N^{t-1}}$: cached tracklets in frame $t-1$ with box $b_i^{t-1}$, identity $id_i$, number of consecutive frames $w_i$ being lost, center point $p_i^{t-1}$.
$D^t = \{(b_j^t, f_j^t, p_j^t)\}_{j=1}^{N^t}$: detected objects in frame $t$ with box $b_j^t$, feature $f_j^t$, center point $p_j^t$.
$\hat{Y}^t = \{\hat{y}_k^t\}_{k=1}^{N_y^t}$: predicted occlusion center points in frame $t$ that satisfy $\hat{y}_k^t > \tau_y$, where $\tau_y$ is one threshold hyper-parameter.

Output: $T^t$: cached tracklets in frame $t$.
$B^t$: tracking results in frame $t$.

1 Step1: Initialize as empty set
2     $T^t \leftarrow \emptyset$, $B^t \leftarrow \emptyset$
3 Step2: Match objects with tracklets, and get the matched index pairs, lost tracklet and unmatched object indices
4     $\{(i_m, j_m)\}_{m=1}^M, \{i_l\}_{l=1}^L, \{j_u\}_{u=1}^U \leftarrow \text{ASSIGN}(T^{t-1}, D^t)$
5 Step3: Update matched tracklet with matched objects
6     for $(i_m, j_m) \in \{(i_m, j_m)\}_{m=1}^M$ do
7        $w_{j_m} \leftarrow 0$
8        $T^t \leftarrow T^t \cup \{(b_{j_m}^t, id_{j_m}, w_{j_m}, p_{j_m}^t)\}$
9        $B^t \leftarrow B^t \cup \{(b_{j_m}^t, id_{j_m})\}$
10 Step4: Initialize new tracklets
11     for $j_u \in \{j_u\}_{u=1}^U$ do
12        $w_{j_u} \leftarrow 0$, $id_{j_u} \leftarrow \text{NEWID}()$
13        $T^t \leftarrow T^t \cup \{(b_{j_u}^t, id_{j_u}, w_{j_u}, p_{j_u}^t)\}$
14        $B^t \leftarrow B^t \cup \{(b_{j_u}^t, id_{j_u})\}$
15 Step5: Handle lost tracklets
16     for $i_l \in \{i_l\}_{l=1}^L$ do
17        if $w_{i_l} < \tau_w$ then /* $\tau_w$ is the time window threshold */
18            /* select the occlusion point and box in current frame to recover the box for lost tracklet */
19            $j^*, k^* = \arg\max_{j,k} G(O(\tilde{b}_{i_l}^t, b_j^t), \hat{y}_k^t)$
20            if $G(O(\tilde{b}_{i_l}^t, b_{j^*}^t), \hat{y}_{k^*}^t) > \tau_o$ then
21               $b_{i_l}^t \leftarrow$ get occluded object box based on Eq.17
22               $T^t \leftarrow T^t \cup \{(b_{i_l}^t, id_{i_l}, w_{i_l}, p_{i_l}^t)\}$
23               $B^t \leftarrow B^t \cup \{(b_{i_l}^t, id_{i_l})\}$
24               $w_{i_l} \leftarrow 0$
25            else
26               $T^t \leftarrow T^t \cup \{(\tilde{b}_{i_l}^t, id_{i_l}, w_{i_l}, p_{i_l}^t)\}$
27               $w_{i_l} \leftarrow w_{i_l} + 1$ 28 Return $T^t$, $B^t$.

OCCLUSION-AWARE MULTI-OBJECT TRACKING

BACKGROUND

Computer vision systems may track multiple objects in order to assess a scene. For example, tracking multiple objects may be a key component of tasks including autonomous driving, robot navigation, and video analysis.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A system for tracking a target object across a plurality of image frames comprises a logic machine and a storage machine. The storage machine holds instructions executable by the logic machine to calculate a trajectory for the target object over one or more previous frames occurring before a target frame. Responsive to assessing no detection of the target object in the target frame, the instructions are executable to predict an estimated region for the target object based on the trajectory, predict an occlusion center based on a set of candidate occluding locations for a set of other objects within a threshold distance of the estimated region, each location of the set of candidate occluding locations overlapping with the estimated region, and automatically estimate abounding box for the target object in the target frame based on the occlusion center.

BRIEF DESCRIPTION OF THE DRAWINGS

FIG. 1 shows a multi-object tracking system.

FIGS. 3A-3D show a method of detecting occluded objects.

FIG. 4 shows a state machine for detecting occluded objects.

DETAILED DESCRIPTION

Figure 2A:
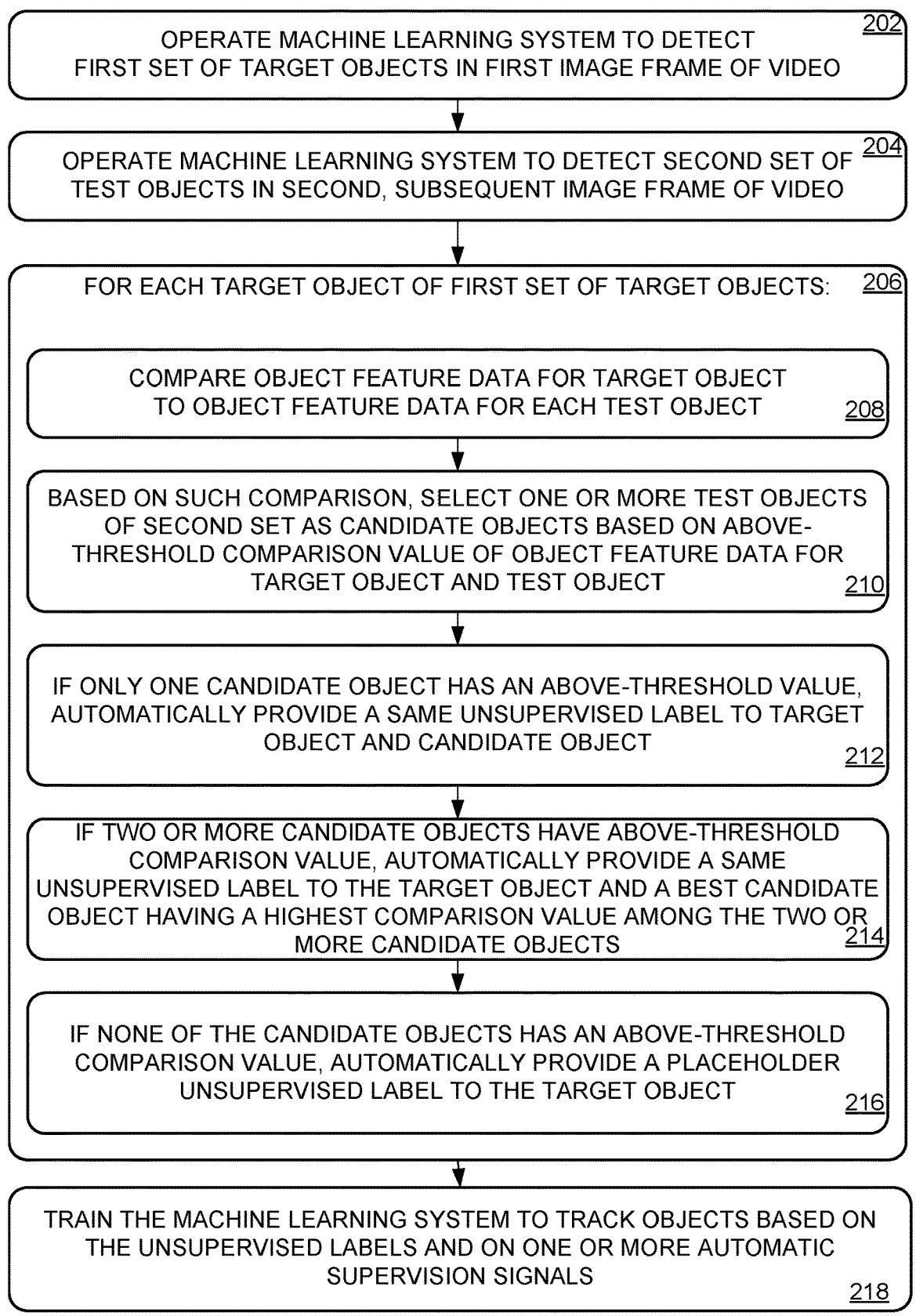
FIGS. 2A-2B show a method of training a multi-object tracking system.

Multi-object tracking (MOT) systems may be employed to detect, track, and/or identify objects in image data (e.g., static image data, video data, or any other spatial, color, brightness, and/or other optical data obtained with any suitable cameras and/or sensors). In general, MOT systems incorporate artificial intelligence (AI), machine learning (ML), computer vision, and/or other computer subsystems configured to perform the detection, tracking, and/or identification, based on processing the image data.

In general, MOT systems may utilize various features of input images (e.g., pixel features, higher-level image features, and/or semantic features determined by an AI and/or ML subsystem) to assess what objects are present in each frame and track one or more of identity, location and/or trajectory of the objects. State-of-the-art and/or future detection subsystems may be configured, in addition to detecting objects, to output additional information regarding detected objects such as object location and extent (e.g., bounding box), object classification (e.g., person vs. animal vs. vehicle, or any other suitable categorization), object features (e.g., semantic features, visual features), object identification (e.g., distinguishing between specific people, distinguishing between specific vehicles). In some examples, object detector subsystems may be utilized to track objects based on detecting them in image frames (e.g., object detectors based on a convolutional neural network, multi-layer neural network, or any other suitable AI, ML, computer vision, or other object detector model).

Even when object detection subsystems successfully detect objects, MOT systems typically cannot track the objects from frame to frame. An object detection subsystem may not always be able to detect an object in every frame. For example, the object detection subsystem may not be able to detect an object in one or more frames due to an adverse condition that affects visibility of the object (e.g., harsh light, insufficient light). In other examples, an object may be posed, deformed, or otherwise configured such that the object detection subsystem fails to detect the object, or detects the object but generates object features that may not be useful for effectively tracking an object that was visible in another frame (e.g., an object detection subsystem may not be able to recognize that a car viewed from the front in one frame is the same car viewed from the side in another frame).

In some examples, an object detected in one frame may be occluded in a subsequent image frame. Detecting highly occluded objects may be a challenging task for both detection and tracking. A single input frame may have insufficient information to perceive highly occluded objects. Anchor-based methods may handle occlusion in detection, including predicting multiple instances for one proposal or detecting one pedestrian with a pair of anchors (one anchor for the head, and another anchor for the full body). However, both may require a carefully designed Non-Maximum Suppression (NMS) algorithm for post processing. In some examples, a mask-guided subsystem may be configured to force the detector to pay attention to the more visible head part and thus detect the whole body of a pedestrian. Instead of handling occlusions in the detection stage, some examples may attempt to leverage an attention model in the tracking stage. Given a detected object, the attention model focuses on the visible region of the object.

A further challenge to object detection is the disappearance of an object from a frame. In some examples, an object may be partially or fully occluded by another object in the frame. As such, even if the object is within a scene represented in an image, there may be limited or zero visible image features corresponding to the object. In other examples, an object may move out of the frame temporarily, while remaining nearby the scene represented in the image and potentially returning into a later image frame. In these examples, object detector subsystems are fundamentally unable to detect the object in a frame, because the object is not present in the frame. Accordingly, MOT systems that track objects exclusively by utilizing object detector subsystems may be fundamentally unable to track an object across a plurality of frames if the object disappears from some of those frames or is otherwise not detected in those frames.

Thus, occlusion may lead to inferior tracking results due to missing objects. As described herein, missed objects may be re-identified using a re-identification (Re-ID) subsystem. Some re-identification subsystems may require a large quantity of labeled data for supervised training, which may make implementation of re-identification subsystems costly or infeasible. Furthermore, without a suitable compensation strategy, a re-identification subsystem may have difficulty tracking a highly occluded object that cannot be detected by the object detector in the first place.

In some examples, a multi-object tracker may incorporate an independent re-identification model in order to learn a discriminative representation for objects. However, such discriminative representation may result in a high computational cost, e.g., due to cropping out the objects from the images and independently feeding cropped images into a pre-trained re-identification model. Learning discriminative representations for objects may be required to identity association in tracking. The representation may be used to re-identify lost objects after disappearing for a while. In some examples, a multi-object tracker may crop the image patch of a detected object, resize, and feed the image patch into a separate Re-ID model. However, this process may be time-consuming since the feature representation of different objects has to be computed independently. To reduce the computation, in some examples, the Re-ID feature computation may be shared with the backbone of an object detector subsystem, for example, in an anchor-based detector or a point-based detector by introducing an extra Re-ID branch that is parallel to a detection branch. In some cases, these costs may be alleviated by formulating a model to share re-identification feature computation with a model backbone, by introducing an extra re-identification branch parallel to an object detection branch of the model, as in anchor-based detectors or point-based detectors.

The Re-ID subsystem may be trained to classify each identity into one class. However, the resulting Re-ID subsystem may be less scalable especially when the number of identities is huge (e.g., a Re-ID system may need to perform hundreds of thousands of classification tasks to train the Re-ID subsystem). For example, original FairMOT™ also pretrains their model on CrowdHuman™. But the Re-ID subsystem is trained with pseudo identity labels, i.e., a unique identity is assigned to each annotated box and the Re-ID subsystem is trained in a classification manner. There are about 339K boxes in CrowdHuman™, so the pseudo identity number is massive, causing the number of parameters in the classifier to be even larger than the total number of parameters in the other subsystems (56.6M vs. 20.3M).

As the number of identities is increased, the classifier tasks may require more and more memory. Furthermore, the training of Re-ID subsystems using prior methods may require supervised training using identity information. However, the acquisition of well annotated data may present a large expense. In some examples, Re-ID representations may be trained by utilizing a cycle association consistency between two adjacent frames. However, in other existing Re-ID systems, the birth and death of objects are not handled. In some examples, a Re-ID subsystem may be trained with pseudo identity information which is obtained by using a simple MOT tracking method using tracklets, wherein a tracklet is a fragment of a track (e.g., a trajectory or path followed by a moving object. Each tracked tracklet is assigned a pseudo identity. However, the pseudo identity information is noisy since an object whose trajectory is broken into several short trajectories may be assigned several identities.

However, even with such improvements, re-identification using supervised machine learning may be difficult to scale, because it may be difficult to generate sufficient supervised labeled data. Furthermore, supervised re-identification learning uses a fully connected neural network layer (e.g., the sibling classification layer) that has a size that is linear proportional to the number of different identities in a dataset. As such, supervised re-identification learning may present costs and/or challenges during training.

To address this problem, the herein disclosed Re-ID subsystem learning mechanism utilizes an unsupervised matching based loss between two adjacent frames, e.g., rather than the supervised classification loss. The matching based loss is formulated based on the observations that 1) objects with the same identity in adjacent frames share a similar appearance (e.g., a particular object does not suddenly and completely change appearance between frames), and 2) objects in different videos (or within one frame of one video) likely have different identities and thus may also have different appearances (since a particular object cannot appear in two different places at once, and since different videos often feature different subjects). Compared to other methods, the herein disclose Re-ID learning mechanism has at least three advantages: 1) it does not need any identity annotation and is therefore more scalable; 2) it is not only suitable for video-based data but also benefits from pre-training on static image-based data; and 3) the matching based loss is irrelevant to the number of identities, thus can be directly trained on massive video-/image-based data with large identity number.

FIG. 1 shows a MOT system 100 that is configured to achieve improved performance for tracking multiple objects across a plurality of image frames, at least in part by leveraging unsupervised labeling of detected objects in different image frames. MOT system 100 includes an object detection subsystem 110 which is operated to detect objects during tracking. MOT system 100 is able to track objects even when the objects cannot be detected by object detection subsystem 110 in one or more of the image frames (e.g., because of being fully or partially occluded or moving fully or partially out of the frame). MOT system 100 alleviates fundamental challenges in object tracking by identifying when the same object occurs in multiple frames with an unsupervised re-identification subsystem 120, and detecting when occluded objects are present with an occlusion estimation subsystem 140.

Re-identification subsystem 120 is configured to re-identify objects without relying on identity information or pseudo identity information. It can be trained, in an unsupervised, matching-based fashion, on both image-based and video-based data without requiring any identity information distinguishing between different objects, and also has better scalability to datasets with massive identities. Unsupervised re-identification subsystem 120 is trained to track objects and account for object tracking during temporary object disappearance using unsupervised training data comprising image or video data representing scenes with multiple objects. The unsupervised training data does not need to be manually labelled, so training data for MOT system 100 may be obtained inexpensively and easily by utilizing existing machine learning training datasets (e.g., for object detectors or other multi-object trackers).

The unsupervised Re-ID subsystem 120 utilizes unsupervised matching based loss between different (e.g., adjacent) frames. The unsupervised Re-ID formulation is motivated by the observation that objects with the same identity in adjacent frames share similar appearance and objects in different videos/images have different identities. The unsupervised Re-ID training is based on supervision signals including: 1) a strong "single object identity" supervision signal indicating that objects within one frame should not be matched with each other; 2) a weak "object persistence"

supervision signal indicating that objects in one frame are likely to be matched with objects in another frame. For example, the single object identity signal indicates that objects in different videos (or within one frame) are assumed to have different identities. Because matching based loss is irrelevant to the number of identities, it does not suffer from the scalability issue and can be directly trained on the massive data.

The ability to train the re-identification subsystem 120 with unsupervised data may alleviate a potentially substantial cost of implementing a re-identification subsystem. It is believed that the performance of the unsupervised re-identification subsystem 120 may exceed performance of supervised re-identification models, thereby improving tracking performance while also alleviating costs associated with training data acquisition. Compared to the supervised classification-based Re-ID learning, the proposed unsupervised Re-ID subsystem does not suffer from the dimension explosion issue for a large identity number and thus may be more applicable for real large-scale applications. There need not be any extra parameters introduced in the disclosed unsupervised Re-ID learning method.

FIG. 2A shows a method 200 of generating training data for multi-object tracking in video data, for example, using an unsupervised Re-ID subsystem. At 202, method 200 includes: operating a machine learning system to detect a first set of target objects in a first image frame of a video. Any suitable object detection model may be used (e.g., object detection subsystem 110 of FIG. 1). For example, the object detection model may feature a convolutional neural network (e.g., a dynamic convolutional neural network, a convolutional neural network with attention, a convolutional variable autoencoder, a pyramidal convolutional neural network, and/or any other neural network model, such as a fully-connected neural network). In some examples, the object detection model may comprise one or more pre-trained, domain-specific models, such as a "people detector" (e.g., convolutional neural network previously trained to detect humans) or a "car detector"). In some examples, the object detection model may be configured to detect one or more different types of entity (e.g., convolutional neural network with output nodes for classifying a detected entity as a car or a person). In still further examples, the object detection model may comprise a plurality of different object detection models, each configured to detect presence of one or more types of object. More generally, the object detection model may be configured to detect an object (e.g., whether or not the object is affirmatively classified as a particular type of object) and to output feature data for the detected object, wherein the feature data comprises any suitable computer-readable data defining detected features of the detected object. For example, the feature data may comprise a vector representation of a detected object, such as an intermediate value computed by the object detection model (e.g., a vector value extracted from an intermediate layer of a convolutional neural network).

At 204, method 200 includes operating the machine learning system to detect a second set of test objects in a second, subsequent, image frame of the video.

At 206, method 200 includes a series of steps that are performed for each target object of the first set of target objects. In particular, at 208, method 200 includes comparing object feature data for the target object to object feature data for each test object of the second set of test objects. Any suitable comparison may be used. As one nonlimiting example, each detected object may be represented by a feature vector indicating a set of computational features of an image (e.g., image data, neural network activation data), and the object feature data may be compared by any suitable means (e.g., by cosine similarity or other geometric similarity function, and/or by a previously-trained machine-learning comparison function).

Based on such comparison, at 210, method 200 further includes selecting one or more test objects of the second set of test objects as being a candidate object based on an above-threshold comparison value of object feature data for the target object and object feature data for the test object. Alternately or additionally, a single test object may be selected as a candidate object based on the comparison value for the candidate object and the target object being a highest comparison value among the set of test objects.

At 212, method 200 further includes, if only one candidate object has an above-threshold comparison value, automatically providing a same unsupervised label to the target object and the candidate object. The unsupervised label indicates a correspondence between objects that can be used for training the re-identification subsystem, the unsupervised label may be generated without any supervision, e.g., without requiring a human annotator to identify and label the objects. The unsupervised label may be any identifier, e.g., a string, an integer, or a GUID. The unsupervised label may be associated with the target object and the candidate object in any suitable data representation, e.g., a training file may be saved for each of the target object and the candidate object, each training file indexed by the unsupervised label and/or including the unsupervised label as a header.

At 214, method 200 further includes, if two or more candidate objects have an above-threshold comparison value, automatically providing a same unsupervised label to the target object and a best candidate object having a highest comparison value among the two or more candidate objects.

At 216, method 200 further includes, if none of the candidate objects has an above-threshold comparison value, automatically providing a placeholder unsupervised label to the target object, e.g., a label indicating that the target object was not found. By using a placeholder label for any candidate object without an above-threshold match, spurious matches may be avoided in cases when the candidate object lacks a true match.

In some examples, comparison values for object feature data are tracked in a similarity matrix. In some examples, the similarity matrix includes a row for each object in a union of both of the first set of target objects and the second set of test objects, and a column for each object in the union, each matrix element representing one comparison value between a pair of objects drawn from the union. In some examples, the similarity matrix includes a placeholder column for the placeholder unsupervised label.

Figure 2B:
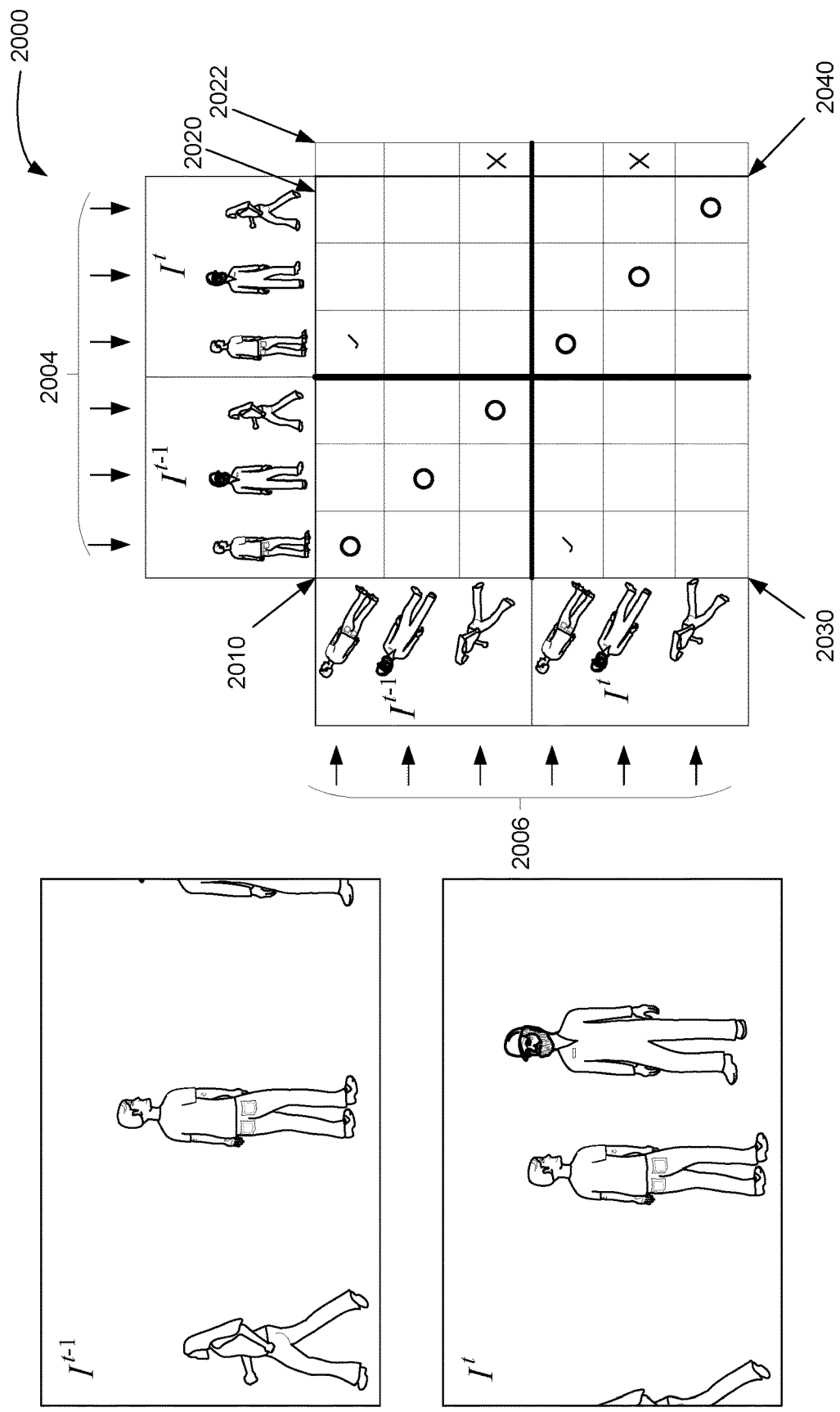

FIG. 2B shows an exemplary depiction of a similarity matrix 2000 (e.g., representing similarity matrix S) indexed by rows 2006 corresponding to each object in frames $I^{f-1}$ and $I^f$ as well as columns 2004 corresponding to each such object and one additional placeholder column 2002. The matrix can be roughly divided into four quadrants 2010, 2020, 2030, 2040 and the placeholder column 2002 (which is outside of the four quadrants). The top-left quadrant 2010 and the bottom right quadrant 2040 are governed by the strong single object identity supervision signal. The top-right quadrant 2020 and the bottom-left quadrant 2030 are governed by the weak object persistence supervision signal. Elements on the diagonal (marked with an "o") are ignored, as these correspond to an object being identified as itself (e.g., as the exact same object in the same frame). Objects are matched to other objects within the quadrants 2020 and 2030 as indicated by a checkmark. In some cases, objects are matched to a cell in the placeholder column, as indicated by an "x".

In some examples, at 218 method 200 further includes training the machine learning system to track objects based on the unsupervised labels and on one or more automatic supervision signals. In some examples, the one or more automatic supervision signals further include a strong single object identity signal, the strong single object identity signal indicating a constraint that the first target object from within the first image frame should not have an above-threshold comparison value for any other object from within the first image frame. In some examples, the one or more automatic supervision signals includes a weak object persistence signal, the weak object persistence signal indicating a constraint that each target object in the first image frame should have an above-threshold comparison value for at most one test object in the second image frame. In some examples, the weak object persistence signal further indicates that if the target object from the first set has an above-threshold comparison value for a test object in the second set, then the test object should also reciprocally have an above-threshold comparison value for the target object. In some examples, the object feature data and the comparison values are generated by one or more differentiable functions. Accordingly, training the machine learning system to track objects includes configuring the one or more differentiable functions based on the unsupervised labels and the one or more automatic supervision signals. In some examples, the one or more differentiable functions includes a neural network configured to compute object feature data based on a cropped image patch.

In some examples, the one or more differentiable functions includes an object detector subsystem of the machine learning system, and wherein the object feature data is an intermediate representation of objects detected by the object detector subsystem.

Turning back to FIG. 1, in one nonlimiting example, Re-identification system 120 may be trained using video-based data as introduced above. For example, let $I^t \in \mathbb{R}^{W \times H \times 3}$ be the t-th frame from one video and $b_i^t = (x_{il}^t, Y_{it}^t, x_{ir}^t, y_{ib}^t)$ be the ground truth bounding box of object i in frame $I^t$ as $f_i^t \in \mathbb{R}^D$ where D is the dimension of the appearance feature vector. The unsupervised Re-ID module learning mechanism may compute $f_i^t$ as long as it is differentiable. Possible solutions include cropping the image patch based on a given bounding box and feeding the cropped image patch into an extra Re-ID network, extracting region of interest (ROI) based appearance features by sharing the same backbone as an object detector network, and extracting center point appearance features.

Given two adjacent frames $I^{t-1}, I^t$, let $i \in \{0, \ldots, N^{t-1}-1, \ldots, N^{t-1}+N^t-1\}$ be the index of all objects in both frames, where $N^t$ is the number of objects in frame $I^t$. In order to learn the Re-ID representation with the supervision signals, a similarity matrix may be used to measure the similarity between each pair of objects, where $$\begin{cases} S_{i,j} = \dfrac{f_i \cdot f_j}{\|f_i\|_2 \|f_j\|_2} & \text{if } i \neq j \\ S_{i,i} = -\infty & \text{else} \end{cases}$$

Values in the diagonal of S are set to negative infinity to avoid assigning an object to itself. In general if objects i and j have the same identity, $S_{i,j} > 0$, otherwise $S_{i,j} < 0$. The assignment matrix $M \in \mathbb{R}^{(N^{t-1}+N^t) \times (N^{t-1}+N^t)}$ be obtained via a row-wise softmax function $$M_{i,j} = \frac{e^{S_{i,j}T}}{\sum_j e^{S_{i,j}T}},$$

where T is the softmax temperature. Since objects in one frame all have different identities, the values in the top-left and bottom-right parts of M may be configured via supervised training using an intra-frame loss function $L_{id}^{intra} = \Sigma_{0 \leq i,j < N^{t-1}} M_{i,j} + \Sigma_{N^{t-1} \leq i,j < N^{t-1}+N^t} M_{i,j}$, corresponding to the single object identity signal. The object persistence signal is defined based on the ideal case where all of the objects appear in both frames. In such case, all the objects in a frame $I^{t-1}$ should match to objects in a next frame $I^t$ in a one-to-one manner. Then, for each row in M, each object is encouraged to be matched to another object with a high confidence by using an inter-margin margin loss $$L_{id}^{inter} = \sum_i \max \left\{ \max_{j', j' = j^*} jM_{i,j'} + m - M_{i,j^*}, 0 \right\},$$

where $$j^* = \underset{j}{\operatorname{argmax}} \, M_{i,j}.$$

The inter-margin margin loss is defined similarly to the popular triple loss, e.g., the maximum matching probability $M_{i,j^*}$ is larger than the sub-maximum value by a pre-defined margin m (e.g., 0.5 or any other suitable pre-defined margin value). Besides the margin loss, another cycle constraint is added for M, meaning that the forward and backward assignment should be consistent with each other. If an object i in frame $I^{t-1}$ is matched with object j in frame $I^{t-1}$, the cycle constraint loss can be defined:

$$L_{id}^{cycle} = \Sigma N^{t-1} \leq N^{t-1} + N^t, 0 \leq j < N^{t-1} |M_{i,j} - M_{j,i}|.$$

Since two adjacent frames in video based data often share some objects with the same identities, such two adjacent frames may be used as a positive sample for Re-ID training, with a total loss for unsupervised Re-ID learning on the positive samples of $$L_{id}^{pos} = \frac{1}{N^{t-1} + N^t} \left( L_{id}^{intra} + L_{id}^{inter} + L_{id}^{cycle} \right).$$

The proposed Re-ID representation introduces a placeholder to handle the birth and death of objects. In some examples, an object in a frame may disappear in a next frame (death of object), or an object that was not visible in a frame may appear in a next frame (birth of object). To handle this issue, a new similarity matrix $S' \in \mathbb{R}^{(N^{t-1}+N^t) \times (N^{t-1}+N^{t+1})}$ is created by padding a placeholder column to S. All values in the padded placeholder are the same value p. Let $M' \in \mathbb{R}^{(N^{t-1}+N^t) \times (N^{t-1}+N^t) \times (N^{t-1}+N^{t+1})}$ be the assignment matrix by applying the row-wise softmax function to S'. Then, M may be replaced with M' in the above equations. By using p, the distance between objects that disappeared or reappeared is encouraged to be learned to be smaller than p.

The placeholder p is introduced to handle the birth and death of objects, i.e., the objects appearing in $I^{t-1}$ but disappearing in $I^t$ and newly appeared objects in $I^t$ should be assigned to the placeholder. Let $S_{i,j}$ be the cosine similarity between the Re-ID feature of objects i and j. For sensible matching, $S_{i,j}$ should be greater than p if objects i and j have the same identity, otherwise $S_{i,j}<p$. Understanding that the cosine similarity between the Re-ID feature of two objects should be positive if they have the same identity, or negative otherwise, an option is to set p=0. However, it is believed that during the early training stage, the variance of the values in S may be small (about 0.015) and the cosine similarity between any pair of objects is around 0.75. So it may be difficult for the model to handle the birth and death of objects well at the beginning if p=0. Therefore, p may better be set by default as the dynamic mean of the values in S (except the diagonal values). Interestingly, training with this strategy, the mean of the values in S is about 0 after convergence. When two different static images are sampled as a negative sample pair, the placeholder p will be set to 0 since all objects in these two images have different identities.

The Re-ID subsystem may also be trained on image based data, for example, by using two augmentations of one image as adjacent frames. However, the positive sample based loss function may not perform as well in this case, because objects in the two augmentations may generally have very similar appearance, thereby not creating a strong encouragement to learn discriminative Re-ID features. Since objects in two different static images are often different entities, a negative sample based loss function is introduced by treating two different static images as a negative sample pair: $L_{id}^{neg}=0 \leq i,j<N^{t-1}+N^t \ M'_{i,j}$. In this formulation, the extra placeholder p from above is utilized. The cosine distance between the objects in the negative pair is encouraged to be less than p, meaning that all objects should be assigned to the placeholder. Therefore, the overall unsupervised Re-ID learning loss for the image based data is:

$$L_{id} = \frac{N^{pos}}{N^{pos}+N^{neg}}L_{id}^{pos} + \frac{N^{neg}}{N^{pos}+N^{neg}}L_{id}^{neg}$$

where $N^{pos}$, $N^{neg}$ the number of positive and negative samples in a batch. As a non-limiting example, there may be 4 times as many positive as negative samples.

In some examples, the machine learning system is further trained, when tracking objects, to automatically detect when the target object is occluded by another object in the second frame, and to estimate a bounding box for the occluded target object in the second frame. For example, such detection may be via an occlusion estimation subsystem. In some examples, detecting when the target object is occluded by another object in the second frame includes calculating a trajectory for the target object based at least on the first frame and/or zero to many preceding frames; and assessing no detection of the target object in the second frame. In some examples, estimating a bounding box for the target object in the second frame includes predicting an estimated region for the target object based on the trajectory. Accordingly, an occlusion center may be predicted based on a set of candidate occluding locations for a set of other objects within a threshold distance of the estimated region, each location of the set of candidate occluding locations overlapping with the estimated region. The bounding box may be estimated based on the predicted occlusion center.

Figure 3D:
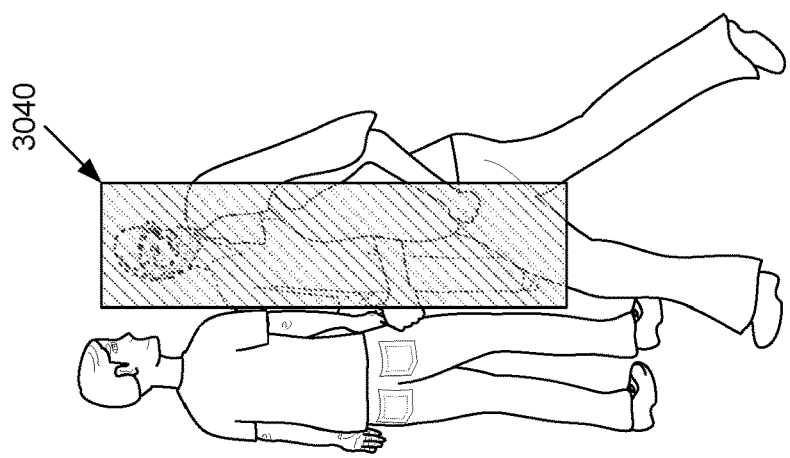
Figure 3C:
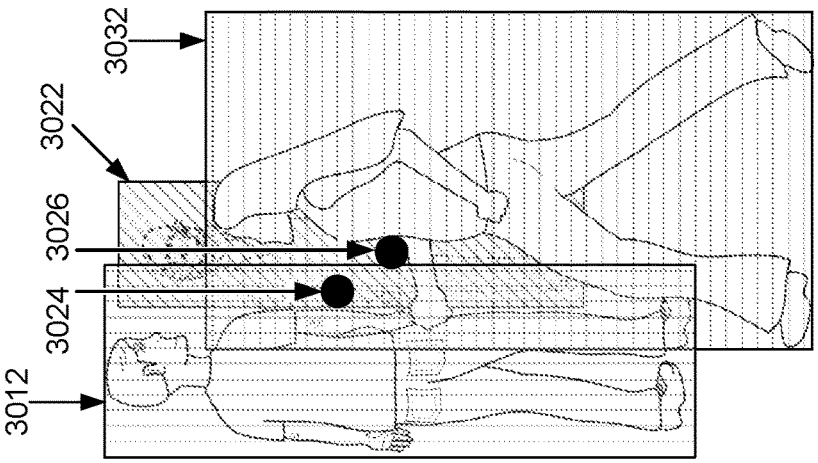
Figure 3B:
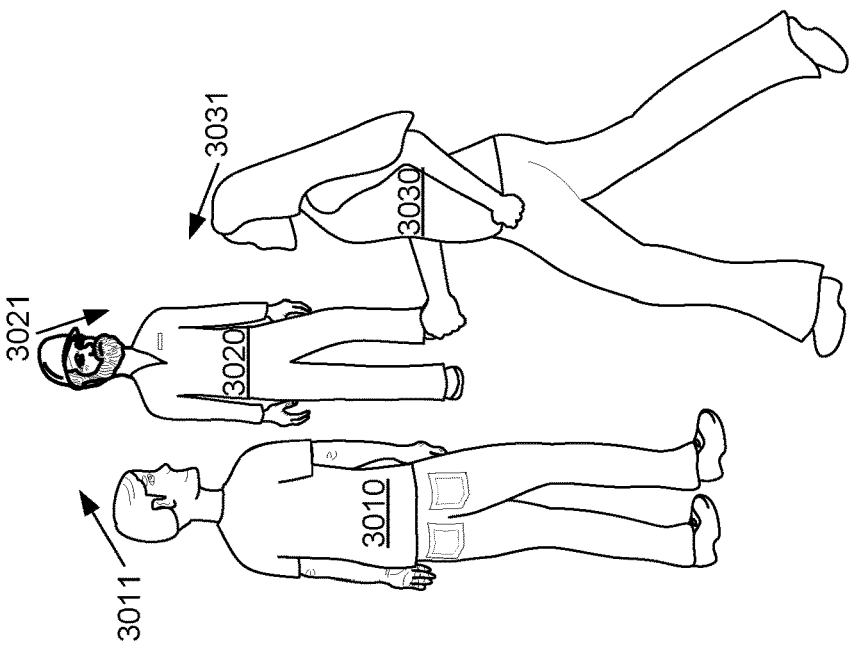

FIG. 3A shows a method 300 of tracking a target object across a plurality of image frames. At 302, method 300 includes calculating a trajectory 3021 for the target object over one or more previous frames occurring before a target frame. For example, FIG. 3B shows a previous frame with a view of three entities, entity 3010 (with trajectory 3011), entity 3020 (with trajectory 3021), and entity 3030 (with trajectory 3031). The trajectory for and object in a frame may be computed in any suitable fashion, for example based on one or more displacement vectors, each displacement vector indicating a direction and magnitude of displacement of an object between two previous frames. For example, the trajectory for an object may be predicted as being a displacement according to a displacement vector for two previous frames. Alternately or additionally, the trajectory for an object may be predicted using a previously-trained machine learning model configured to predict trajectories based on previous motion indicated in displacement vectors.

At 304, method 300 includes assessing no detection of the target object in the target frame. For example, in FIG. 3C, entity 3020 from FIG. 3B is not detected.

At 306, method 300 includes predicting an estimated region 3222 for the target object based on the trajectory. The estimated region is predicted by displacing a bounding box for the target object in a previous frame according to the calculated trajectory, to a new bounding box in the target frame having the dimensions of the target object and a location determined by the calculated trajectory.

At 308, method 300 includes predicting an occlusion center 3024 based on a set of candidate occluding locations for a set of other objects within a threshold distance of the estimated region, each location of the set of candidate occluding locations overlapping with the estimated region. FIG. 3C shows an estimated region 3022 for entity 3020 (which was not detected in FIG. 3C) via motion from the previous frame (e.g., the trajectory of entity 3020 in frames before 3C place the likely position in frame 3C at estimated region 3022). For example, the occlusion center 3024 may be predicted based on the set of candidate occluding locations by finding a center of an intersect region of bounding boxes 3012 and 3022; the occlusion center 3026 may be predicted in similar fashion based on finding a center of an intersection region of bounding boxes 3022 and 3032. The candidate occlusion location is chosen as the closer one of occlusion center 3024 and occlusion center 3026 to a center point consistent with predicted trajectory 3021. In this example, candidate occlusion location 3026 is chosen as the occlusion center point (e.g., $\hat{p}_{ik}^t$ defined below).

At 310, method 300 includes automatically estimating a bounding box for the target object in the target frame based on the occlusion center and the size and/or bounding box of the target object in the previous frame. For example, FIG. 3D shows an estimated bounding box 3040 (e.g., bounding box $b_i^t$ as defined below). As compared to bounding box 3022, bounding box 3040 is estimated based on the selected occlusion center using a state machine according to the present disclosure, thereby locating the target objects in the target frame with greater accuracy compared to the estimated region based solely on the trajectory.

In some examples, method 300 further includes calculating a heatmap for the occlusion center by operating one or more convolutional neural network units. In some examples, estimating the bounding box includes operating a state machine configured to record state information including the tracking status and tracked motion of a plurality of objects, and to estimate the bounding box based on such recorded state information. In some examples, estimating the bounding box includes operating a Kalman filter. In some examples, estimating the bounding box includes training a machine learning system to automatically estimate the bounding box, via supervised learning with image data and ground-truth bounding boxes.

Returning to FIG. 1, occlusion estimation subsystem 140 is configured to recognize and track occluded objects by estimating the occlusion location and the motion of existing tracklets, for example, using method 300. Although the Re-ID subsystem can help re-identify reappeared objects after their short-term disappearance, it may be unable to track the occluded objects if they are not detected by the detectors. To mitigate the issue caused by the missed detection, occlusion estimation subsystem 140 is configured to predict whether any occlusion occurs and find lost objects by considering the temporal motion information and the tracking status of existing tracklets.

Occlusion estimation subsystem 140 may include an attention subsystem which focuses on the occluded (or overlapped) areas where occlusions happen, rather than the visible regions of objects.

The occlusion estimation subsystem 140 may perform motion estimation for the objects in existing tracklets and predict whether occlusion will happen between two objects in the future. The occlusion estimation subsystem 140 may further estimate an occlusion map which shows all possible occlusion locations. By further combining the status of existing tracklets with these two components, a lost object re-finding mechanism can be configured to find the occluded objects.

The occlusion estimation mechanism may be based upon key-point based detection, which detects the locations where occlusions happen and finds the objects missed by the detector by combining the temporal information in existing tracklets. The occlusion estimation subsystem may alleviate the tracking lost issue caused by missing detection. The occlusion estimation subsystem is configured to find the occluded objects by simultaneously estimating an occlusion map that shows all possible occlusion locations and utilizing motion estimation information.

Locations of occlusion may be treated as key-points and detected by key-point estimation. Different from the Re-ID subsystem, the learning of the occlusion estimation module may be designed in a supervised way, with occlusion annotations generated based on bounding boxes of target objects, e.g., from existing tracking datasets like MOT™.

First, the occurrence of occlusion may be defined based on the bounding box coordinates of two objects i and j within one image, their overlapped regions is defined as $o_{ij}=O(b_i, b_j)=(x_{ij_l}, y_{ij_t}, x_{ij_r}, y_{ij_b})$, where $x_{ij_l}=\max(x_{i_l}, x_{j_l})$, $y_{ij_t}=\max(y_{i_t}, y_{j_t})$, $x_{ij_r}=\max(x_{i_r}, x_{j_r})$, $y_{ij_b}=\max(y_{i_b}, y_{j_b})$. An occlusion between objects i and j is detected if the respective overlapped region occupies a large portion of one object:

$$H(o_{ij}) = \begin{cases} 1 & \text{if } \frac{A(o_{ij})}{\min(A(b_i), A(b_j))} > \tau \\ 0 & \text{else} \end{cases}$$

where A is a function computing the area of a box, and $\tau$ is a hyperparameter which may be set with any suitable value (e.g., 0.7 by default). To refind an occluded object, the occlusion location of two overlapped objects is defined as the center point of the overlapped region $o_{ij}$. The ground truth occlusion map Y is rendered by a 2D Gaussian kernel function based on all the valid occlusions (e.g., as defined in $H(o_{ij})$) such that $$Y_{x,y} = \max_{ij} G(o_{ij}, (x, y)),$$

subject to $H(o_{ij})=1$, where $$G(o_{ij}, (x, y)) = \exp\left(-\frac{\left((x, y) - \lfloor \frac{p_{ij}}{R} \rfloor\right)^2}{2\sigma_{o_{ij}}^2}\right)$$

where $$p_{ij} = \left(\frac{x_{ij_l} + x_{ij_r}}{2}, \frac{y_{ij_t} + y_{ij_b}}{2}\right)$$

is the center point of occlusion $o_{ij}$ and $\sigma_{o_{ij}}$ the standard deviation of a Gaussian kernel relative to the size of the occlusion. In some examples, an extra convolutional neural network (CNN) head may be introduced to obtain the predicted occlusion center heatmap $$\hat{Y} \in \mathbb{R}^{\frac{W}{R} \times \frac{H}{R}}.$$

In some examples, the CNN head may be parallel to the detection head and sharing the same backbone network. R is the down sampling factor of the backbone network. The value $\hat{Y}_{x,y} \in [0,1]$ denotes a probability of an occlusion center located in (x,y) and is supervised by $L_{cen}^{occ} = \Sigma_{x,y} L(Y_{x,y}, \hat{Y}_{x,y})$ where L is any suitable loss function, e.g., a focal loss function with two hyperparameters $\alpha, \beta$ which may take on any suitable values, e.g., 2 and 4 respectively, such that $$L(y, \hat{y}) = \begin{cases} -(1-\hat{y})^\alpha \log(\hat{y}) & \text{if } y = 1 \\ -(1-y)^\beta (\hat{y})^\alpha \log(1-\hat{y}) & \text{else} \end{cases}.$$

Considering that R may be larger than 1, an additional CNN head may be added to produce an offset heatmap $$\hat{\Lambda} \in \mathbb{R}^{\frac{W}{R} \times \frac{H}{R}},$$

which may help compensate the quantization error in generating the occlusion center heatmap Y. The L1 loss function may be used to regress the center offset $$L_{occ}^{off} = \sum_{ij} \left| \hat{\Lambda}_{\lfloor \frac{p_{ij}}{R} \rfloor} - \left(\frac{p_{ij}}{R} - \lfloor \frac{p_{ij}}{R} \rfloor\right) \right|.$$

The offset supervision may be specified only at the center locations. The overall occlusion estimation loss may be defined $$L_{occ} = \frac{1}{\sum_{i,j} H(o_{ij})} (L_{occ}^{cen} + L_{occ}^{off})$$

Though the above occlusion estimation subsystem can predict all the possible occlusion locations, i.e., center points of overlapped region, it is not equivalent to detecting a missing object near these locations. For example, some occluded objects may already have been detected by the detector. On the other hand, even if a missing object is detected, only using the estimated occlusion locations may not be enough to infer the size of the occluded object and the precise location. To determine whether a missing object is detected, a state machine is configured to record the tracking status of existing tracklets, and match the latest detection results with these tracklets. If some tracklets cannot find a matched detection box, a missing object may have been detected. The detailed tracking logic is elaborated in FIG. 4. The matching strategy between the tracklets and the detection boxes in Step 2 of FIG. 4 can follow either the original strategy used in the target MOT system or any suitable strategy based on Intersection-over-Union (IOU) and Re-ID feature matching. Once the missing detection happens, the missing objects may be found by using the motion information of the corresponding tracklets, which can be estimated by a Kalman filter. As an example, to refind a lost object i in $I^t$, with bounding box in $I^{t-1}$ denoted as $b_i^{t-1} = (x_{il}^{t-1}, y_{il}^{t-1}, x_{ir}^{t-1}, y_{ib}^{t-1})$. The location in $I^t$ is predicted via Kalman filter and denoted as $\tilde{b}_i^t = (\tilde{x}_{il}^t, \tilde{y}_{it}^t, \tilde{x}_{ir}^t, \tilde{y}_{ib}^t)$. Then the detected objects near that possibly occluded i may be searched by considering the estimated occlusion centers close to $\tilde{b}_i^t$. For each box $b_j^t$ that possibly overlapped with $\tilde{b}_i^t$ the target occlusion position is calculated as $\tilde{o}_{ij} = O(\tilde{b}_i^t, b_j^t)$ according to the distances between $\tilde{o}_{ij}$ and all the predicted occlusion centers $\hat{p}_{ik}^t = (x_{ik}^t, y_{ik}^t)$ located within $\tilde{b}_i^t$, The best matched pair is chosen (j', k')=$\mathrm{argmax}_{j,k} G(\tilde{o}_{ij}, \hat{p}_{ik}^t)$. If $G(\tilde{o}_{ij}, \hat{p}_{ik}^t) > \tau_o$ ($\tau_o = 0.7$ by default), the estimated box $b_i^t$ for the missing object I may be estimated based on $\tilde{b}_i^t$, $b_j^t$, and $\hat{p}_{ik}^t$, as $x_{i_l}^t = F(\tilde{x}_{i_l}^t, \tilde{x}_{i_r}^t, x_{j'_l}^t, x_{j'_r}^t, x_{i'_k}^t)$, $y_{i_t}^t = F(\tilde{y}_{i_t}^t, \tilde{y}_{ib}^t, y_{j'_t}^t, y_{j'_r}^t, y_{i'_k}^t)$, $x_{i_r}^t = x_{i_l}^t + \tilde{x}_{i_r}^t - \tilde{x}_{i_l}^t$, and $y_{i_b}^t = y_{i_t}^t + \tilde{y}_{i_b}^t - \tilde{y}_{i_t}^t$, where $$F(a_1, a_2, b_1, b_2, z) = \begin{cases} 2z - b_1 - (a_2 - a_1) & \text{if } a_1 \leq b_1 \text{ and } a_2 \leq b_2, \\ z - \frac{a_2 - a_1}{2} & \text{if } a_1 > b_1 \text{ and } a_2 \leq b_2, \\ 2z - b_2 & \text{if } a_1 > b_1 \text{ and } a_2 > b_2, \\ a_1 & \text{else} \end{cases}$$

In some examples, occlusion centers and occlusion offsets may be computed in an occlusion estimation subsystem, for example via one or more convolutional layers (e.g., such as a 3×3 convolutional layer configured to output a 256-channel feature map, and/or via a 1×1 convolutional layer configured to compute a task-specific heatmap). In some examples, one or more convolutional layers may be connected via a ReLU, sigmoid, identity function, or any other suitable activation function. In some examples, an occlusion center branch may be configured to compute an output heatmap and/or an occlusion offset heatmap, using a ReLU, sigmoid, or identity function.

The unsupervised Re-ID learning subsystem and occlusion detection subsystem disclosed herein can be applied to any suitable MOT methods. In some examples, an occlusion loss function computed by the occlusion estimator may be used in addition to detection loss functions in a MOT framework, e.g., as a weighted sum. It is believed that MOT performance is further improved due to the occlusion estimation subsystem 140 (e.g., facilitating object tracking even when an object is partially or fully occluded for one or more frames). The methods described herein may be used along with any suitable state-of-the-art and/or future MOT framework, e.g., into a framework using a tracking-by-detection paradigm.

It is believed that the methodology described herein may enable superior performance in MOT scenarios. For example, the methodology described herein has been evaluated with MOTChallenge™ datasets in ablation studies evaluating the improvement in performance from various techniques described herein, with regard to one or more standard metrics of MOT performance such as MOT accuracy (MOTA), MOT precision (MOTP), ID F1 Score (IDF1), Mostly Tracked Objects (MT), Mostly Lost Objects (ML), false positives (FP), false negatives (FN), number of identity switches (IDS), and number of fragments (Frag). It is believed that unsupervised re-identification may be able to achieve similar or better performance as compared to supervised re-identification. Furthermore, it is believed that the addition of pre-training based on image data, and/or the addition of occlusion estimation, result in further improvements to MOT performance.

In some examples, a supervised re-identification learning system (e.g., FairMOT™) may be replaced with unsupervised re-identification learning, for example by directly substituting a re-identification loss function with an unsupervised re-identification learning loss function defined according to the present disclosure. When integrating the methods disclosed herein into another MOT framework, the detection subsystem(s) of such framework may be left unchanged and the occlusion estimation subsystem may be added in parallel with the detection subsystem(s). The Re-ID subsystem is trained using Re-ID features from two frames. For example, an object detector may be used to detect all the objects of interest in each frame, then a subsequent tracker may be utilized to associate the objects across different frames (e.g., online, or offline). Online methods process video sequences frame-by-frame and track objects by only using information up to the current frame. By contrast, offline methods process video sequences in a batch and utilize the whole video information. Separate modeling or joint modeling methods may be utilized. In separate modeling methods, the tracker is independently trained and assumes the detection results are available in advance. In joint modeling methods, the tracker is jointly trained with the detector by sharing the same feature extractor backbone. Therefore, in some examples, joint modeling methods may be more computationally efficient than the separate modeling methods. Both the newly proposed Re-ID subsystem and occlusion estimation subsystem may be integrated into the online tracking-by-detection MOT system and jointly learned with the detector.

The methodology described herein may be used with any MOT system that can be configured to use a differentiable re-identification feature learning subsystem, which may be replaced with the unsupervised re-identification subsystem of the present disclosure to enable large-scale unsupervised training. Furthermore, the methodology described herein may be used in any MOT system that utilizes a convolutional neural network for object detection. When the methodology described herein is applied to existing methods, existing object detection subsystems may be unchanged and the re-identification and/or occlusion estimation subsystems described herein may be added in parallel to the existing detection subsystem(s). For example, the methodology described herein may be integrated into FairMOT™, CenterTrack™, any other methodology that utilizes a key-point based detector such as CenterNet™, or any other suitable MOT methodology. In some examples, the subsystems described herein may be optimized via an optimization subsystem, e.g., via the Adam™ optimizer. In some examples, the subsystems described herein may be pre-trained on supplemental datasets, for example, an unsupervised re-identification subsystem may be pre-trained on image-based data as described above, for example, using the CrowdHuman™ dataset. Unsupervised re-identification and occlusion estimation may be used separately or simultaneously. For example, both unsupervised re-identification and occlusion estimation may be used in the context of FairMOT™ which is a re-identification-based methodology. In contrast, occlusion estimation may be used with CenterTrack™ even though CenterTrack™ is not based on re-identification.

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
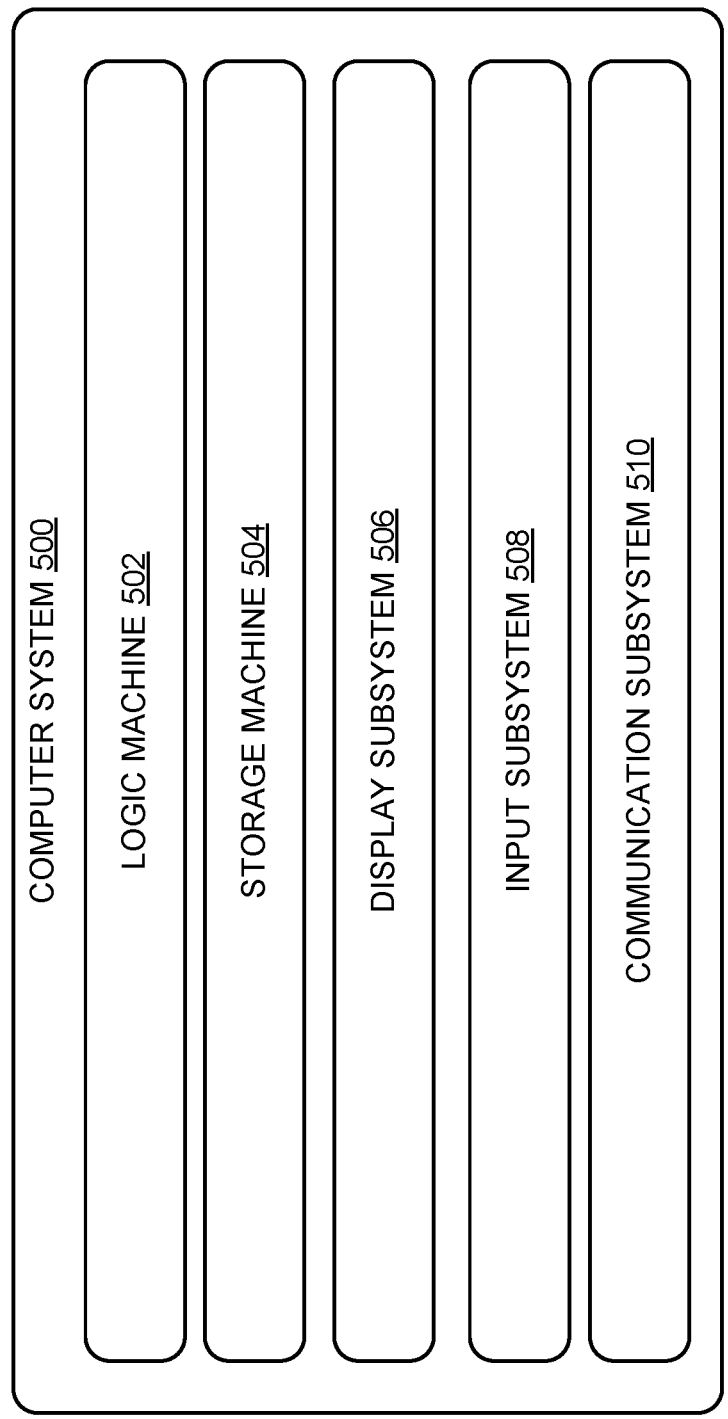
FIG. 5 shows an exemplary computing system.

FIG. 5 schematically shows a non-limiting embodiment of a computing system 500 that can enact one or more of the methods and processes described above. Computing system 500 is shown in simplified form. Computing system 500 may take the form of one or more personal computers, server computers, tablet computers, home-entertainment computers, network computing devices, gaming devices, mobile computing devices, mobile communication devices (e.g., smart phone), and/or other computing devices.

Computing system 500 includes a logic machine 502 and a storage machine 504. Computing system 500 may optionally include a display subsystem 506, input subsystem 508, communication subsystem 510, and/or other components not shown in FIG. 5.

Logic machine 502 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 504 includes one or more physical devices configured to hold instructions executable by the logic machine to implement the methods and processes described herein. When such methods and processes are implemented, the state of storage machine 504 may be transformed—e.g., to hold different data.

Storage machine 504 may include removable and/or built-in devices. Storage machine 504 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 504 may include volatile, nonvolatile, dynamic, static, read/write, read-only, random-access, sequential-access, location-addressable, file-addressable, and/or content-addressable devices.

It will be appreciated that storage machine 504 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 502 and storage machine 504 may be integrated together into one or more hardware-logic components. Such hardware-logic components may include field-programmable gate arrays (FPGAs), program-and application-specific integrated circuits (PASIC/ASICs), program- and application-specific standard products (PSSP/ASSPs), system-on-a-chip (SOC), and complex programmable logic devices (CPLDs), for example. In some implementations, the computing system 500 may include two or more independently operable computing devices; for example a dedicated backend training device and a dedicated runtime device that utilizes a model trained using the dedicated backend training device. In some implementations, training and runtime may be performed by the same computing device. A dedicated backend training device and/or a runtime device may include a training storage device that holds instructions that are executable to train a machine learning system as described herein.

The terms "module," "program," and "engine" may be used to describe an aspect of computing system 500 implemented to perform a particular function. In some cases, a module, program, or engine may be instantiated via logic machine 502 executing instructions held by storage machine 504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 506 may be used to present a visual representation of data held by storage machine 504. This visual representation may take the form of a graphical user interface (GUI). As the herein described methods and processes change the data held by the storage machine, and thus transform the state of the storage machine, the state of display subsystem 506 may likewise be transformed to visually represent changes in the underlying data. Display subsystem 506 may include one or more display devices utilizing virtually any type of technology. Such display devices may be combined with logic machine 502 and/or storage machine 504 in a shared enclosure, or such display devices may be peripheral display devices.

When included, input subsystem 508 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 510 may be configured to communicatively couple computing system 500 with one or more other computing devices. Communication subsystem 500 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

In an example, a system for tracking a target object across a plurality of image frames, comprises a logic machine, and a storage machine. In this or any example, the storage machine holds instructions executable to: calculate a trajectory for the target object over one or more previous frames occurring before a target frame; responsive to assessing no detection of the target object in the target frame: predict an estimated region for the target object based on the trajectory; predict an occlusion center based on a set of candidate occluding locations for a set of other objects within a threshold distance of the estimated region, each location of the set of candidate occluding locations overlapping with the estimated region; and automatically estimate a bounding box for the target object in the target frame based on the occlusion center. In this or any example, the instructions are further executable to calculate a heatmap for the occlusion center by operating one or more convolutional neural network units. In this or any example, estimating the bounding box includes operating a state machine configured to record state information including tracking status and tracked motion of a plurality of objects, and to estimate the bounding box based on such recorded state information. In this or any example, estimating the bounding box includes operating a Kalman filter. In this or any example, the instructions are further executable to train a machine learning system to automatically estimate the bounding box, via supervised learning with image data and ground-truth bounding boxes. In this or any example, instructions held on a training storage device are executable to train a machine learning system to track objects based on one or more unsupervised labels, the unsupervised labels based on comparison values indicating similarity between object feature data for objects in a first video frame to object feature data for objects in a second video frame. In this or any example, one or more comparison values for object feature data are tracked in a similarity matrix including: a row for each object in a union of both of the first set of target objects and the second set of test objects, a column for each object in the union, and a placeholder column for the placeholder unsupervised label, wherein each matrix element represents one comparison value between a pair of objects drawn from the union. In this or any example, the object feature data and the comparison values are generated by one or more differentiable functions, and wherein training the machine learning system to track objects includes configuring the one or more differentiable functions based on the unsupervised labels and the one or more automatic supervision signals.

In an example, a method of tracking a target object across a plurality of image frames, the method comprises: calculating a trajectory for the target object over one or more previous frames occurring before a target frame; assessing no detection of the target object in the target frame; predicting an estimated region for the target object based on the trajectory; predicting an occlusion center based on a set of candidate occluding locations for a set of other objects within a threshold distance of the estimated region, each location of the set of candidate occluding locations overlapping with the estimated region; and automatically estimating a bounding box for the target object in the target frame based on the occlusion center. In this or any example, the method further comprises calculating a heatmap for the occlusion center by operating one or more convolutional neural network units. In this or any example, estimating the bounding box includes operating a state machine configured to record state information including tracking status and tracked motion of a plurality of objects, and to estimate the bounding box based on such recorded state information. In this or any example, estimating the bounding box includes operating a Kalman filter. In this or any example, the method comprises training a machine learning system to automatically estimate the bounding box, via supervised learning with image data and ground-truth bounding boxes.

In an example, a method of generating training data for multi-object tracking in video data, the method comprising: operating a machine learning system to detect a first set of target objects in a first image frame of a video; operating the machine learning system to detect a second set of test objects in a second, subsequent, image frame of the video; for each target object of the first set of target objects: comparing object feature data for the target object to object feature data for each test object of the second set of test objects; selecting one or more test objects of the second set of test objects as being a candidate object based on an above-threshold comparison value of object feature data for the target object and object feature data for the test object; if only one candidate object has an above-threshold comparison value, automatically providing a same unsupervised label to the target object and the candidate object; if two or more candidate objects have an above-threshold comparison value, automatically providing a same unsupervised label to the target object and a best candidate object having a highest comparison value among the two or more candidate objects; and if none of the candidate objects has an above-threshold comparison value, automatically providing a placeholder unsupervised label to the target object. In this or any example, the comparison values for object feature data are tracked in a similarity matrix including a row for each object in a union of both of the first set of target objects and the second set of test objects, a column for each object in the union, and a placeholder column for the placeholder unsupervised label, wherein each matrix element represents one comparison value between a pair of objects drawn from the union. In this or any example, the method further comprises training the machine learning system to track objects based on the unsupervised labels and on one or more automatic supervision signals. In this or any example, the one or more automatic supervision signals further include a strong single object identity signal, the strong single object identity signal indicating a constraint that the target object from within the first image frame should not have an above-threshold comparison value for any other object from within the first image frame. In this or any example, the one or more automatic supervision signals includes a weak object persistence signal, the weak object persistence signal indicating a constraint that each target object in the first image frame should have an above-threshold comparison value for at most one test object in the second image frame. In this or any example, the weak object persistence signal further indicates that if the target object from the first set has an above-threshold comparison value for a test object in the second set, then the test object should also reciprocally have an above-threshold comparison value for the target object. In this or any example, the object feature data and the comparison values are generated by one or more differentiable functions, and wherein training the machine learning system to track objects includes configuring the one or more differentiable functions based on the unsupervised labels and the one or more automatic supervision signals.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A system for tracking a target object across a plurality of image frames, comprising:
a logic machine; and
a storage machine holding instructions executable by the logic machine to:
calculate a trajectory for the target object over one or more previous frames occurring before a target frame, wherein the target object is detected by tracking, in a similarity matrix, comparison values indicating similarity between object feature data for a first set of objects detected in a first previous frame, the first set of objects including the target object, and object feature data for a second set of objects in a second previous frame, wherein the similarity matrix includes:
a row for each object in a union of both of the first set of objects and the second set of objects; and
a column for each object in the union,
wherein each matrix element of the similarity matrix represents one comparison value between a pair of objects drawn from the union;
responsive to assessing no detection of the target object in the target frame:
upon determining that the target object is not detected in the target frame due to being occluded by a set of one or more other objects, predict an estimated region for the target object based on the trajectory;
predict an occlusion center based on a set of candidate occluding locations for the set of other objects within a threshold distance of the estimated region, each location of the set of candidate occluding locations overlapping with the estimated region; and
automatically estimate a bounding box for the target object in the target frame based on the occlusion center, wherein the bounding box is estimated via a trained machine learning system trained via supervised learning with image data and ground-truth bounding boxes.

2. The system of claim 1, wherein the instructions are further executable to calculate a heatmap for the occlusion center by operating one or more convolutional neural network units.

3. The system of claim 1, wherein estimating the bounding box includes operating a state machine configured to record state information including tracking status and tracked motion of a plurality of objects, and to estimate the bounding box based on such recorded state information.

4. The system of claim 1, wherein estimating the bounding box includes operating a Kalman filter.

5. The system of claim 1, further comprising a training storage device holding instructions executable to train a machine learning system to track objects based on one or more unsupervised labels.

6. The system of claim 5, wherein the similarity matrix further includes
a placeholder column for the placeholder unsupervised labels.

7. The system of claim 5, wherein the object feature data and the comparison values are generated by one or more differentiable functions, and wherein training the machine learning system to track objects includes configuring the one or more differentiable functions based on the unsupervised labels and one or more automatic supervision signals.

8. A method of tracking a target object across a plurality of image frames, the method comprising:
calculating a trajectory for the target object over one or more previous frames occurring before a target frame, wherein the target object is detected by tracking, in a similarity matrix, comparison values indicating similarity between object feature data for a first set of objects detected in a first previous frame, the first set of objects including the target object, and object feature data for a second set of objects in a second previous frame, wherein the similarity matrix includes:
a row for each object in a union of both of the first set of objects and the second set of objects; and
a column for each object in the union,
wherein each matrix element of the similarity matrix represents one comparison value between a pair of objects drawn from the union;
assessing no detection of the target object in the target frame due to the target object being occluded by a set of one or more other objects;
predicting an estimated region for the target object based on the trajectory;
predicting an occlusion center based on a set of candidate occluding locations for the set of other objects within a threshold distance of the estimated region, each location of the set of candidate occluding locations overlapping with the estimated region; and
automatically estimating a bounding box for the target object in the target frame based on the occlusion center, wherein the bounding box is estimated via a trained machine learning system trained via supervised learning with image data and ground-truth bounding boxes.

9. The method of claim 8, further comprising calculating a heatmap for the occlusion center by operating one or more convolutional neural network units.

10. The method of claim 8, wherein estimating the bounding box includes operating a state machine configured to record state information including tracking status and tracked motion of a plurality of objects, and to estimate the bounding box based on such recorded state information.

11. The method of claim 8, wherein estimating the bounding box includes operating a Kalman filter.

* * * * *